United States Patent
Kimura et al.

(10) Patent No.: US 9,591,213 B2
(45) Date of Patent: Mar. 7, 2017

(54) ELECTRONIC DEVICE, METHOD AND STORAGE MEDIUM FOR GENERATING AN IMAGE

(71) Applicant: KABUSHIKI KAISHA TOSHIBA, Tokyo (JP)

(72) Inventors: Mitsuhiro Kimura, Ome Tokyo (JP); Kaoru Matsuoka, Musashino Tokyo (JP); Kosuke Haruki, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 44 days.

(21) Appl. No.: 14/634,325

(22) Filed: Feb. 27, 2015

(65) Prior Publication Data
US 2016/0057328 A1 Feb. 25, 2016

(30) Foreign Application Priority Data
Aug. 20, 2014 (JP) .................................. 2014-167354

(51) Int. Cl.
*H04N 5/232* (2006.01)

(52) U.S. Cl.
CPC ..... *H04N 5/23232* (2013.01); *H04N 5/23212* (2013.01)

(58) Field of Classification Search
CPC ........................ H04N 5/23232; H04N 5/23212
See application file for complete search history.

(56) References Cited

U.S. PATENT DOCUMENTS

| | | | |
|---|---|---|---|
| 8,253,848 B2* | 8/2012 | Terashima | H04N 5/23212 348/345 |
| 2008/0259176 A1 | 10/2008 | Tamaru | |
| 2009/0310885 A1 | 12/2009 | Tamaru | |
| 2010/0315528 A1* | 12/2010 | Goh | H04N 5/23219 348/222.1 |
| 2014/0176758 A1* | 6/2014 | Fujita | H04N 5/23245 348/223.1 |

FOREIGN PATENT DOCUMENTS

| | | |
|---|---|---|
| JP | 2003-319235 | 11/2003 |
| JP | 2008-271240 | 11/2008 |
| JP | 2010-020758 | 1/2010 |

* cited by examiner

*Primary Examiner* — Gevell Selby
(74) *Attorney, Agent, or Firm* — Knobbe, Martens, Olson & Bear LLP

(57) ABSTRACT

In an embodiment, an electronic device includes circuitry configured to automatically execute exposures at a photographing range including at least a first region and a second region, with different focuses by a camera, and acquire first images generated by the exposures, and display a second image on a display based on the first images. A number of exposures at the photographing range of a first photographing and a second photographing are different. The first photographing is a case when a difference between a distance from the camera to the first subject and a distance from the camera to the second subject is greater than or equal to a first value. The second photographing is a case when the difference is smaller than the first value.

15 Claims, 10 Drawing Sheets

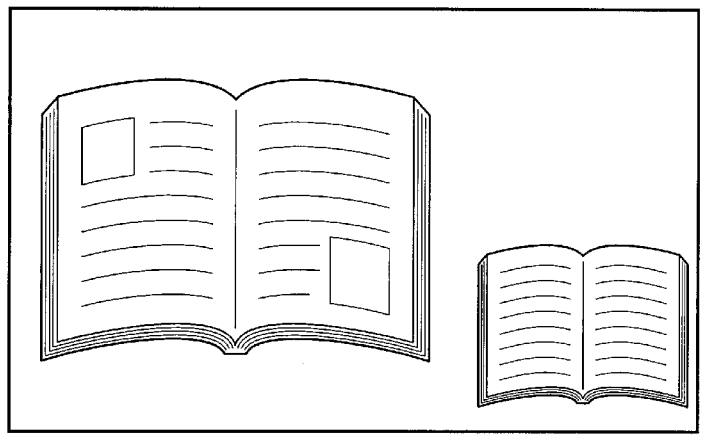
F I G. 4
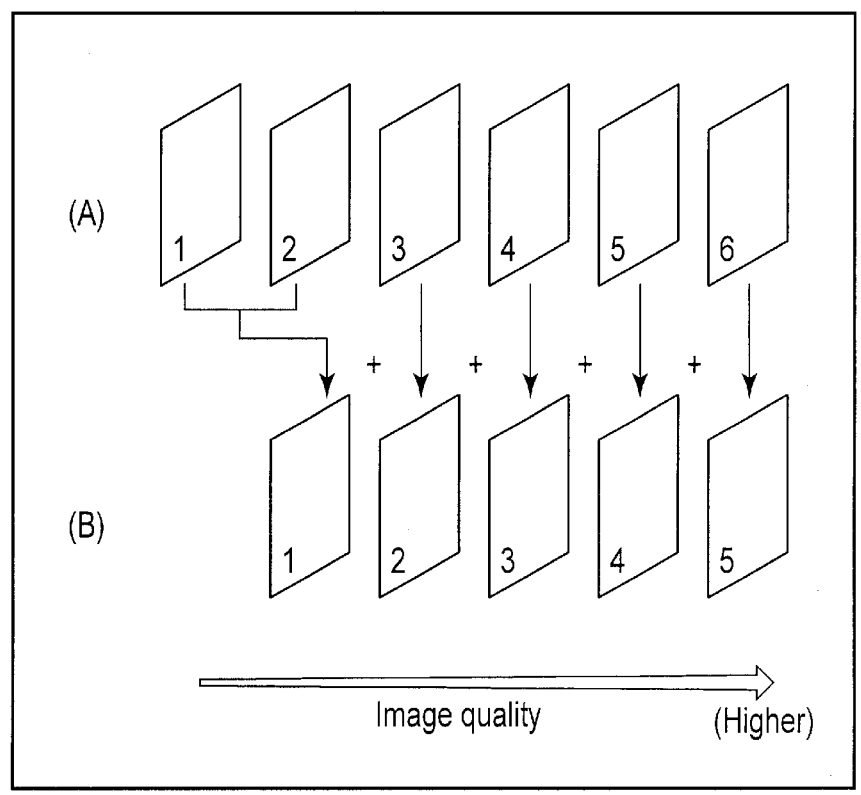
F I G. 5

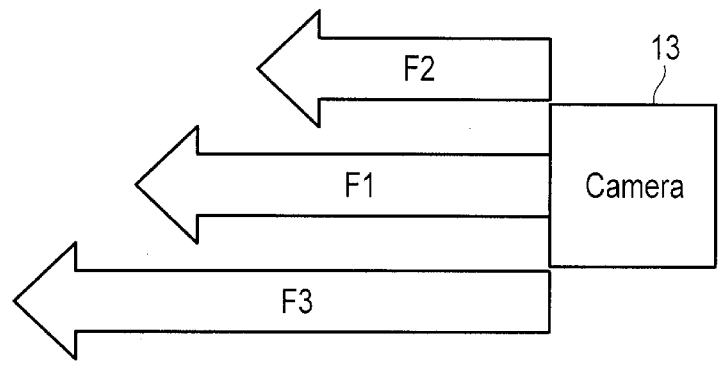
F I G. 10
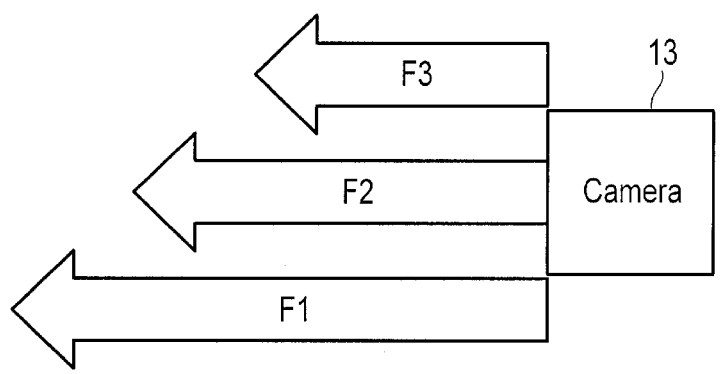
F I G. 11

ELECTRONIC DEVICE, METHOD AND STORAGE MEDIUM FOR GENERATING AN IMAGE

CROSS-REFERENCE TO RELATED APPLICATIONS

This application is based upon and claims the benefit of priority from Japanese Patent Application No. 2014-167354, filed Aug. 20, 2014, the entire contents of which are incorporated herein by reference.

FIELD

Embodiments described herein relate generally to an electronic device, a method and a storage device.

BACKGROUND

A portable electronic device equipped with a camera capable of photographing (taking images of) various subjects such as a tablet computer and a smartphone has been widespread. Some cameras built in such electronic devices have, for example, a function of automatically adjusting a camera focus (autofocus function) to obtain a high contrast image.

The camera focus is generally adjusted to a part of the photography area, but not to the other parts, in a depth of field. In particular, this inclination is remarkable in macro photography (closeup). In capture photography, etc. of a document, an image having high sharpness (for example, an all-focused image where a focus is adjusted to an entire photography area) such that contents of the document can be recognized as a whole, can hardly be taken.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an illustration for explanation of a function of a camera application program.

FIG. 5 is an illustration for explanation of the function of the camera application program.

FIG. 10 is an illustration showing an example of a focus set value determined by the focus position determining processing.

FIG. 11 is an illustration showing an example of a focus set value determined by the focus position determining processing.

DETAILED DESCRIPTION

Various embodiments will be described hereinafter with reference to the accompanying drawings.

In general, according to one embodiment, an electronic device includes a camera and circuitry configured to automatically execute exposures at a photographing range, with different focuses by the camera, the photographing range including at least a first region where a first subject is located and a second region where a second subject is located; and acquire first images generated by the exposures, and display a second image on a display based on the first images. A number of exposures at the photographing range of a first photographing and a second photographing are different. The first photographing is a case when a difference between a distance from the camera to the first subject and a distance from the camera to the second subject is greater than or equal to a first value. The second photographing is a case when the difference is smaller than the first value.

Figure 1:
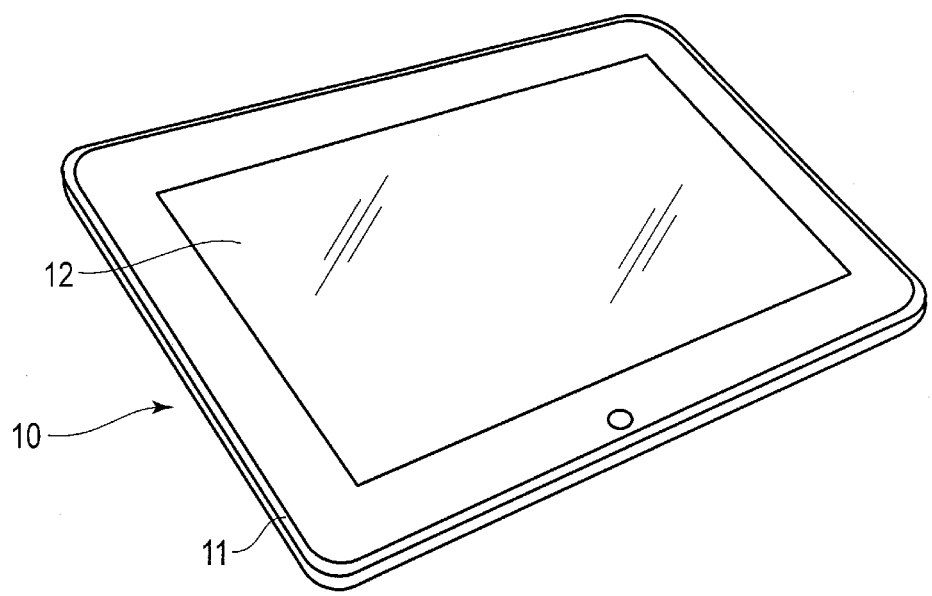
FIG. 1 is a perspective view showing an example of an appearance of an electronic device of an embodiment.

FIG. 1 is a perspective view showing an example of an appearance of an electronic device of the present embodiment. The electronic device is a portable electronic device and can be implemented as, for example, a tablet computer, a smartphone or the like. In FIG. 1, the electronic device is implemented as a tablet computer. The electronic device of the present embodiment is hereinafter described as a tablet computer.

An electronic device 10 shown in FIG. 1 includes a body 11 and a touchscreen display 12. The body 11 is a housing shaped in a thin box. A flat panel display and a sensor for detecting a contact position of a finger, etc. on a screen of the flat panel display are built in the touch screen display 12. The flat panel display includes, for example, an LCD, etc. A sensor includes, for example, a touchpanel, etc. In this case, the touchpanel is provided to cover the LCD.

Figure 2:
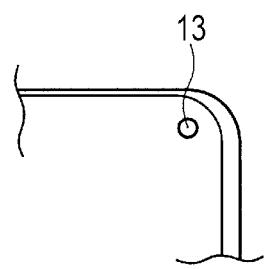
FIG. 2 is an illustration showing an example of an appearance of a back surface side of the electronic device.

FIG. 2 is an illustration showing an example of an outer appearance (part) of a back surface side of the electronic device 10. A camera 12 capable of photographing (images including) various subjects is built in the back surface of the electronic device 10 as shown in FIG. 2. When an application program for taking an image is activated by using the camera 13, the subject image in a photography area (photographing range) of the camera 13 is displayed on the touch screen display 12 in a real time. This display is called, for example, a finder view or a camera view. In addition, for example, a camera button is displayed on the touch screen display 12. If a touch input operation is executed on the touch screen display 12 to press the camera button, an image which is being displayed as a finder view is recorded (taken).

Figure 3:
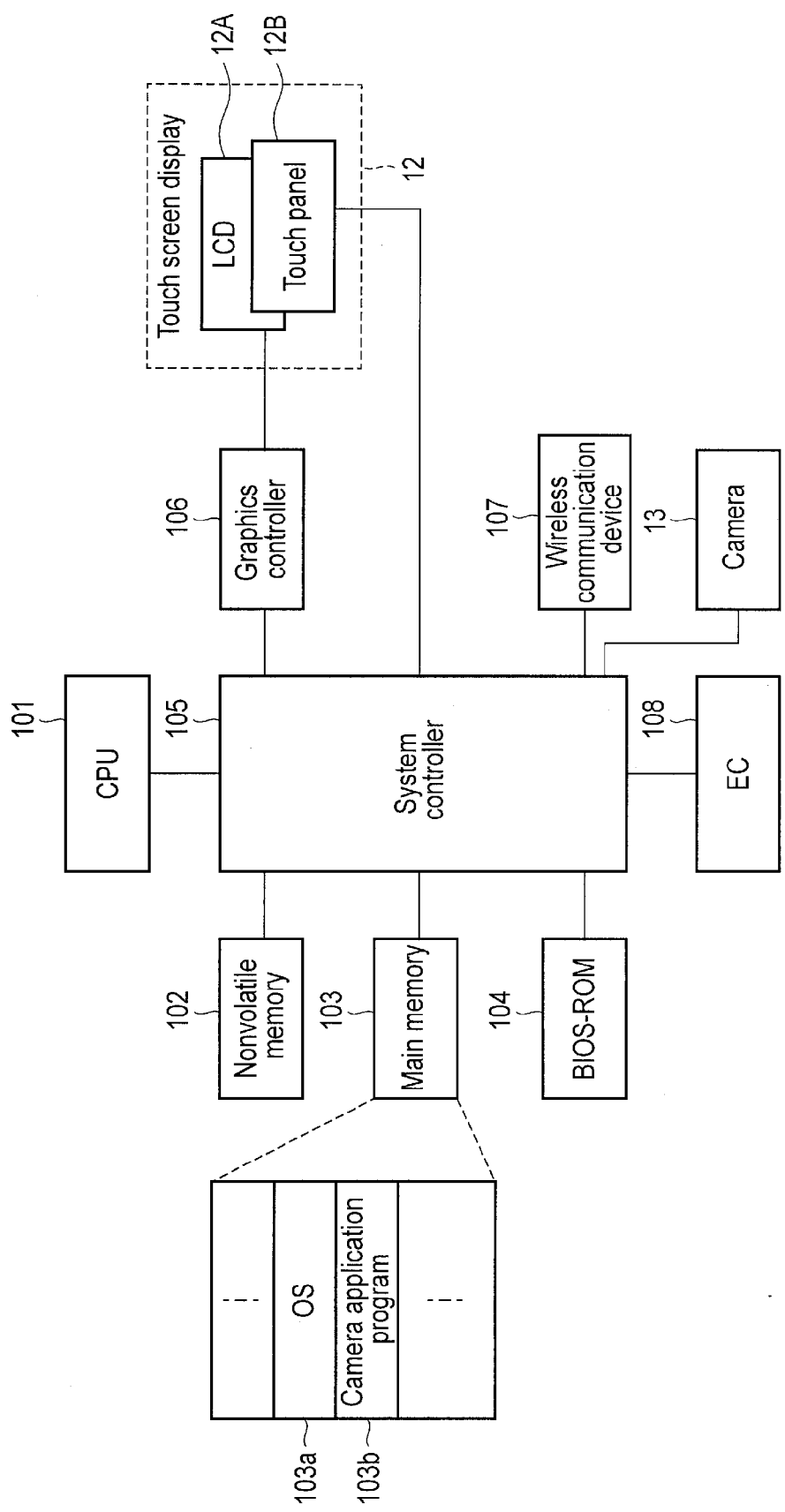
FIG. 3 is a circuit diagram showing an example of a system configuration of the electronic device.

FIG. 3 is a block diagram showing an example of a system configuration of the electronic device 10. The electronic device 10 includes a CPU 101, a nonvolatile memory 102, a main memory 103, a BIOS-ROM 104, a system controller 105, a graphics controller 106, a wireless communication device 107, an EC 108, etc., as shown in FIG. 3. The touch screen display 12 shown in FIG. 1 includes an LCD 12A and a touchpanel 12B.

The CPU 101 is a processor which controls operations of various components in the electronic device 10. The CPU 101 loads various types of software from the nonvolatile memory 102 on the main memory 103 and then executes the software. The software includes an operating system (OS) 103a and various application programs. The various application programs include an application program (camera application program) 103b for taking (shooting) an image by the camera 13.

The CPU 101 also executes a BIOS stored in the BIOS-ROM 104. The BIOS is a program for hardware control.

The system controller 105 is a device which makes connection between a local bus of the CPU 101 and various components. Various controllers for driving and controlling the components, such as a memory controller which controls access to the main memory 103, are built in the system controller 105.

The graphics controller 106 is a display controller which controls an LCD 12A employed as a display monitor of the electronic device 10. The LCD 12A displays a screen image, based on a display signal generated by the graphics controller 106.

The wireless communication device 107 is a device configured to execute wireless communication such as wireless LAN or 3G mobile communication. The EC 108 is a one-chip microcomputer including an embedded controller for power management. In addition, the EC 108 has a function of turning on/off power of the electronic device 10 in accordance with user operations of the power button.

The camera 13 shown in FIG. 2 is connected to the system controller 105 as shown in FIG. 3. The camera 13 is assumed to has an auto-focus function of automatically matching (adjusting) a focus of the camera 13 to be capable of obtaining, for example, an image of high contrast.

Next, the camera application program 103b operating on the electronic device 10 will be described in detail.

First, functions of the camera application program 103b will be described with reference to FIG. 4 and FIG. 5.

Macro photography (closeup photography) using the camera 13 of the electronic device 10 is assumed here. An image of two double spread books is captured as shown in FIG. 4. In this case, taking an image giving sharpness so as to be capable of recognizing contents of two double spread books on which character (strings) are written, i.e., a full-focus image focusing an entire photography area, is required. In macro photography, for example, an image in which an area around a center is focused but a peripheral portion is blurred is easily taken, and an image which is entirely high in sharpness can hardly be taken.

The camera application program 103b thus includes a function of generating an image having high sharpness as a whole (hereinafter called a high sharpness image) by synthesizing a sequence of images photographed (shot) while moving a focus (position). Such a function is called "focal sweep (function)".

A focus position of the present embodiment includes (a subject included in) a region on the finder view to adjust the focus. In addition, adjusting the focus on the region on the finder view is, for example, to control a lens position of the camera 13 so as to enhance the contrast in the region.

FIG. 5 is an illustration for explanation of a basic principle of the focal sweep. (A) in FIG. 5 shows a sequence of images shot while moving the focus. It is assumed here that six images are taken. (B) in FIG. 5 shows images in a process of generating the high sharpness images (including a high-sharpness image of a final product).

If a first image and a second image are taken on different focuses, the two images are synthesized and an image which has higher sharpness (image quality) than that of each of the images and which has a focus adjusted at two different portions (i.e., different regions in the images) in the photography area is generated as shown in FIG. 5. Subsequently, if a third image is further taken on a different focus, further enhancement of sharpness in the images (increase in image quality) is attempted by further synthesizing the third images. After that, an image of higher sharpness (synthesized image) is generated by repeating the same operation.

Resolution (number of pixels) of the taken image and resolution (number of pixels) of the image of higher sharpness of the final product may be the same as each other or may be varied from each other. In other words, the resolutions (numbers of pixels) of the image to be subjected to focal sweep and the image subjected to focal sweep may be the same as or may be varied from each other. In addition, the processing for generating the image of higher sharpness by the focal sweep may be processing for generating an image in which the focus is relatively adjusted in at least a part of region, from an original image, and the images may have the same resolution (number of pixels) or different resolution (number of pixels) as described above.

In the example shown in FIG. 5, six images are taken to generate an image of higher sharpness. To reduce the time required to generate the image of higher sharpness, the number of images required to generate the image of higher sharpness, i.e., the count of taking images of photography areas by the camera 13 until generating the image of higher sharpness (hereinafter called photographing count) needs to be reduced. Thus, the electronic device 10 of the present embodiment has a function of controlling the photographing count required to generate the image of higher sharpness by using a sharpness map to be described later.

Figure 6:
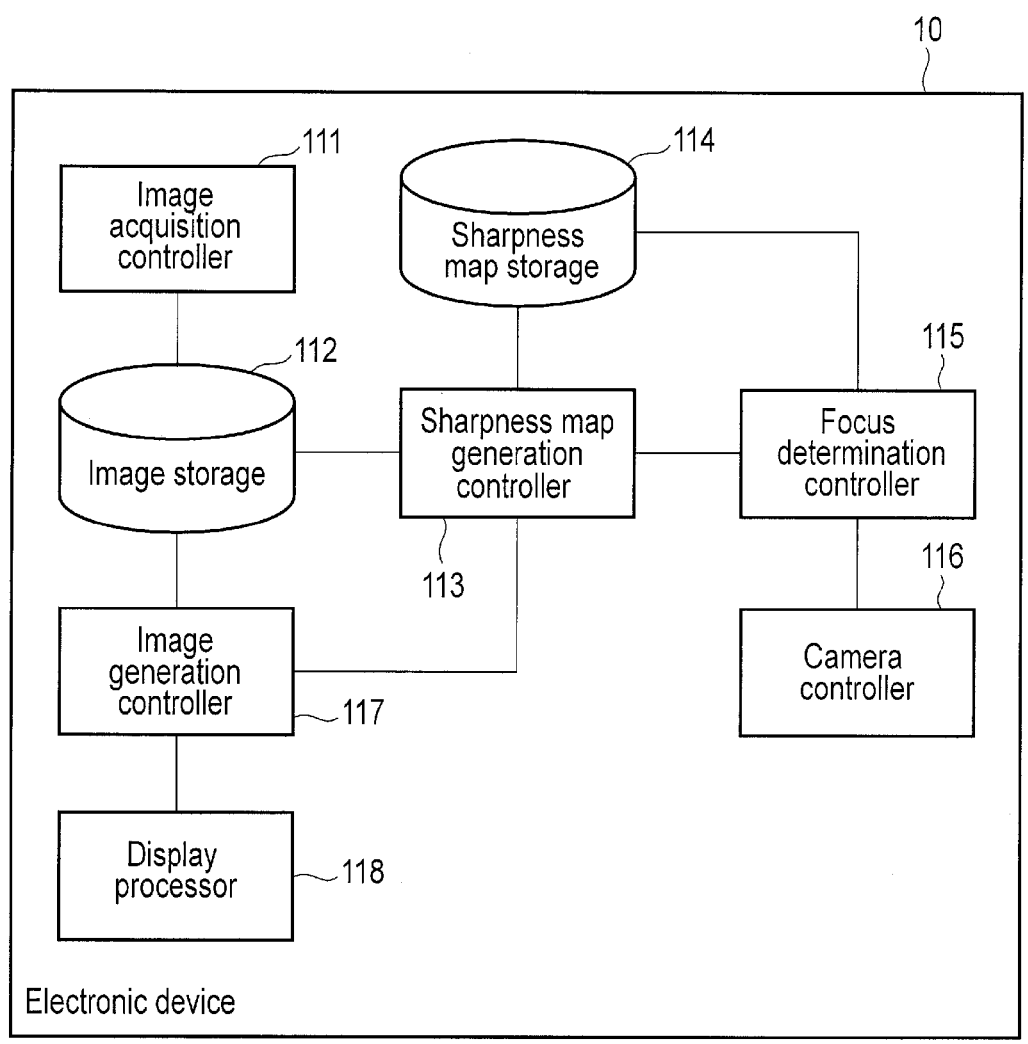
FIG. 6 is a circuit diagram showing an example of a functional structure of the electronic device.

FIG. 6 is block diagram showing an example of a functional configuration of the electronic device 10 of the present embodiment. Functional modules regarding the above-described focal sweep will be mainly explained here.

The electronic device 10 includes an image acquisition controller 111, an image storage 112, a sharpness map generation controller 113, a sharpness map storage 114, a focus determination controller 115, a camera controller 116, an image generation controller 117, and a display processor 118 as shown in FIG. 6. In the present embodiment, the image acquisition controller 111, the sharpness map generation controller 113, the focus determination controller 115, the camera controller 116, the image generation controller 117, and the display processor 118 are functional modules implemented by executing the above-described camera application program 103b by a computer (for example, the CPU 101) of the electronic device 10. In addition, the image storage 112 and the sharpness map storage 114 are assumed to be stored in the nonvolatile memory 102.

The image acquisition controller 111 acquires, for example, one or more images of the photography area (photography range) including regions where a plurality of subjects are located, which are shot by the camera 13 (i.e., first images generated by exposures at the photographing range). The images acquired by the image acquisition controller 111 are stored in the image storage 112.

The sharpness map generation controller 113 generates a sharpness map of the images from the images stored in the image storage 112 (i.e., the images acquired by the image acquisition controller 111). In this case, the sharpness map generation controller 113 divides the images stored in the image storage 112 into a predetermined number of blocks (regions) and generates a sharpness map having the sharpness (value) of each of the blocks. The sharpness is an index (value) indicating image sharpness. The sharpness generated by the sharpness map generation controller 113 is stored in the sharpness map storage 114. The sharpness map generation controller 113 generates the sharpness map for each of the images stored in the image storage 112 (i.e., the images acquired by the image acquisition controller 111).

If the first image is acquired by the image acquisition controller 111, the focus determination controller 115 determines a region on the finder view where focus is adjusted as a focus position in next photographing using the camera 13, based on the sharpness of each block which the sharpness map of the image generated by the sharpness map generation controller 113 has.

In addition, if the second image and the following images are acquired by the image acquisition controller 111, the focus determination controller 115 determines the focus position by comparing the sharpness of the corresponding blocks in the sharpness maps of the respective images generated by the sharpness map generation controller 113.

The camera controller 116 automatically execute exposures at a photographing range, with different focuses by the camera 13. In other words, the camera controller 116 controls the camera 13 such that photographing with different focuses is automatically executed in the photography area at one or more times by using the camera 13. More specifically, the camera controller 116 controls the camera 13 to take an image or images in a state in which the focus is adjusted at the focus position determined by the focus determination controller 115, on the finder view.

The image generation controller 117 generates the high sharpness image (second image) by using one or more images stored in the image storage 112. The high sharpness image generated by the image generation controller 117 is stored in the image storage 112.

The display processor 118 displays the high sharpness image generated by the image generation controller 117 on, for example, the touch screen display 12.

Next, a procedure of the electronic device 10 of the present embodiment when using the focal sweep will be described with reference to a flowchart of FIG. 7.

First, the user activates the camera application program 103b on the electronic device 10 by executing the operations on the electronic device 10. In this case, a subject image such as a double spread book in the photography area of the camera 13 is displayed at a real time as the finder view, on the touch screen display 12 of the electronic device 10.

Figure 7:
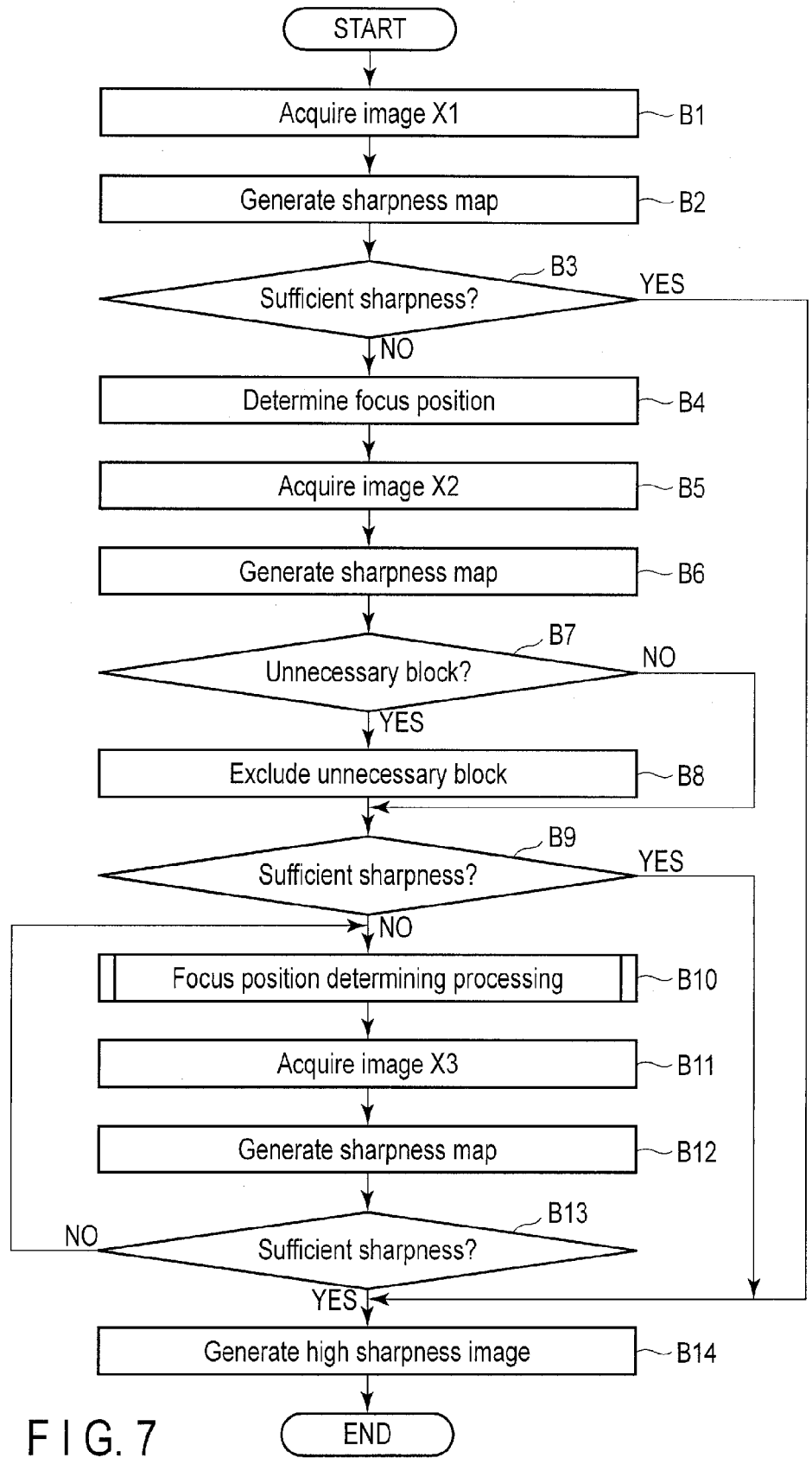
FIG. 7 is a flowchart showing an example of a procedure of the electronic device when using focal sweep.

The user is assumed to fix (hold) (the camera 13 built in) the electronic device 10 so as to photograph the same photography area while the processing shown in FIG. 7 is executed. In other words, the finder view for the same photography area (i.e., the same finder view) is assumed to be continuously displayed on the touch screen display 12 while the processing shown in FIG. 7 is executed.

For example, a button (hereinafter called a focal sweep button) for instructing the focal sweep to be used is assumed to be displayed on the finder view. When the user uses the focal sweep, the user presses the focal sweep button on the touch screen display 12. Photographing using the camera 13 is thereby started.

In this case, the camera 13 takes an image which is being displayed as the finder view, for example, in a state in which the focus is adjusted by an autofocus function (touch focus function) capable of adjusting the focus to the region in part within an angle of view.

The image acquisition controller 111 thereby acquires the first image (hereinafter called image X1 for convenience) (Block B1). The image X1 acquired by the image acquisition controller 111 includes, for example, a region including the subject such as the double spread document and a region including a subject other than the document. The image acquisition controller 111 stores the acquired image X1 in the image storage 112.

The value indicating the focus position at taking the image X1 (i.e., the position where the focus is adjusted by the auto-focus function) (hereinafter called focus set value) is held in the electronic device 10. The focus set value is a value correlating to (a plane including the subject located in) a distance from the camera 13 in which the focus has been adjusted, and can be obtained from, for example, a position, etc. of the lens of the camera 13 in which the focus is adjusted. In other words, the focus set value is a value indicating the distance from the camera 13 to (the plane including) the subject included in the region where the focus is adjusted. In the following descriptions, the focus set value indicating the focus position at taking the image X1 is called focus set value F1.

Next, the sharpness map generation controller 113 generates the sharpness map, based on the image X1 stored in the 112 (Block B2).

Figure 8:
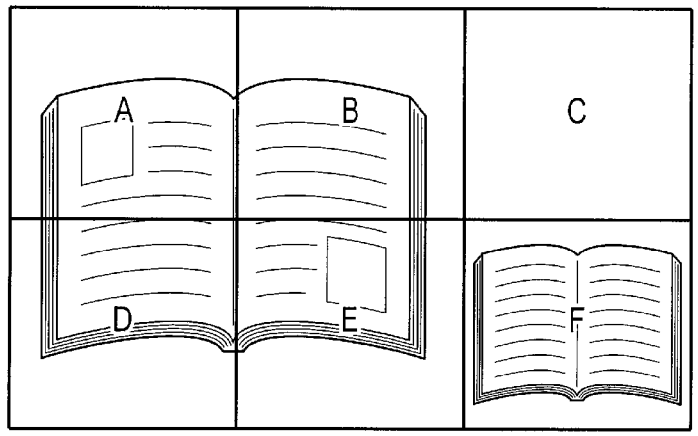
FIG. 8 is an illustration showing an example of dividing an image into s plurality of blocks.

In this case, the sharpness map generation controller 113 divides the image X1 stored in the image storage 112 into a plurality of blocks (regions) having a constant width. FIG. 8 shows an example of dividing the image X1 into a plurality of blocks. In the example shown in FIG. 8, the image X1 is divided into six blocks A-F.

The sharpness map generation controller 113 computes the sharpness (value) in each of the blocks thus divided. The sharpness is a value numeralizing the image sharpness and is computed based on, for example, a brightness value, etc. in each block.

For example, a great value is computed as the sharpness in a block in which the focus is adjusted, and a small value is computed as the sharpness in a block in which the focus is not adjusted (i.e., blurred). If characteristic subjects are not present (i.e., if uncharacteristic subjects alone present) in the block in which the focus is adjusted, comparatively low sharpness is computed as compared with a case where characteristic subjects are present in the block. The characteristic subjects include, for example, (characters, etc. written in) the above-described double spread document. On the other hands, the uncharacteristic subjects include, for example, a table face or the like unprovided with a pattern, etc. Furthermore, if the characteristic subjects are not present in the block in which the focus is not adjusted, comparatively low sharpness is computed as compared with a case where characteristic subjects are present.

By executing such processing, the sharpness map having sharpness of each of the blocks (for example, blocks A-F) obtained by dividing the image X1 (hereinafter called sharpness map of the image X1) is generated. The sharpness map of the image X1 thus generated is stored in the sharpness map storage 114.

Next, the sharpness map generation controller 113 determines whether an image of sufficient sharpness has been obtained by photographing at one time or not, by referring to the sharpness map of the image X1 (Block B3). In this case, for example, if the sharpness of each of the blocks in the sharpness map of the image X1 is equal to or greater than a predetermined value (hereinafter called threshold value), it is determined that an image of sufficient sharpness has been obtained. On the other hand, if at least one of the sharpnesses of the blocks in the sharpness map of the image X1 is not equal to or greater than the threshold value, it is determined that an image of sufficient sharpness has not been obtained.

If the sharpnesses of the predetermined number (or rate) or more of the blocks are equal to or greater than the threshold value in the sharpness map of the image X1, it may be determined that the image of sufficient sharpness is obtained.

If it is determined that the image of sufficient sharpness is not obtained (NO in Block B3), the focus determination controller 115 determines the focus position where, for example, the sharpness of the region corresponding to the block of low sharpness becomes higher at the next photographing, based on the sharpnesses of the respective blocks in the sharpness map of the image X1 (Block B4).

The processing in Block B4 will be described in detail. The focus determination controller 115 specifies the block of the lowest sharpness, of the plurality of blocks obtained by dividing the image X1, by comparing the sharpnesses of the respective blocks in the sharpness map of the image X1.

The same finder view as that at taking the image X1 is displayed on the touch screen display 12.

In this case, the focus determination controller 115 determines the region corresponding to the block of the lowest sharpness as specified as described above, on the finder view displayed on the touch screen display 12, as the region where the focus is to be adjusted (i.e., the focus position) (Block B4).

Next, the camera controller 116 controls the camera 13 to take the image which is being displayed as the finder view, in a state in which the focus is adjusted in the region which is determined as the focus position by the focus determination controller 115, on the finder view.

The image acquisition controller 111 thereby acquires the second image (hereinafter called image X2 for convenience) (Block B5). The image X2 acquired by the image acquisition controller 111 is the same as the above-described image X1 except the focus positions in the images are different. The image acquisition controller 111 stores the acquired image X2 in the image storage 112.

The focus set value indicating the focus position at taking the image X2 (i.e., the focus position determined in Block B4) (hereinafter called focus set value F2) is held in the electronic device 10. The focus set value F2 is a value indicating the distance from the camera 13 to the subject included in the region where the focus is adjusted as described above.

Next, the sharpness map generation controller 113 generates the sharpness map (hereinafter called sharpness map of image X2), based on the image X2 stored in the image storage 112 (Block B6). The sharpness map of the image X2 as generated here is a sharpness map having sharpness of each of blocks (for example, blocks A-F) obtained by dividing the image X2, similarly to the sharpness map of the image X1. In other words, the blocks in the sharpness map of the image X2 correspond to the blocks in the sharpness map of the image X1, respectively. The generation of the sharpness map has been explained in Block B2 described above, and its detailed descriptions are omitted. In addition, the sharpness map of the image X2 is stored in the sharpness map storage 114.

The sharpness map generation controller 113 determines whether an unnecessary block is included in the plurality of blocks obtained by dividing the image X1 and the image X2, based on the sharpness map of the image X1 and the sharpness map of the image X2 stored in the sharpness map storage 114 (Block B7).

In this case, if the blocks of low sharpness (i.e., sharpness having small variation) are included in both the sharpness map of the image X1 and the sharpness map of the image X2 although the image X2 is taken by changing the focus position at taking the image X1, the sharpness map generation controller 113 determines that unnecessary blocks are included in the sharpness maps.

More specifically, if the sharpness of block F in the sharpness map of the image X1 is lowest as compared with the sharpness of the other blocks, the image X2 is taken in a state in which the focus is adjusted to the region corresponding to block F. In this case, if the sharpness of block F is not improved even in the sharpness map of the image X2 thus taken, it can be predicted that no characteristic subject is present in (the region corresponding to) block F and that the sharpness is evaluated to be comparatively lower. Accordingly, block F is regarded as an unnecessary block since the sharpness does not need to be increased.

If it is determined that unnecessary blocks are included (YES in Block B7), the unnecessary blocks are excluded in a subsequent processing (Block B8).

On the other hand, if it is determined that unnecessary blocks are not included (NO in Block B7), the processing in Block B8 is not executed.

Next, the sharpness map generation controller 113 determines whether an image of sufficient sharpness has been obtained during the photographing at two times or not, by referring to the sharpness map of the image X1 and the sharpness map of the image X2 (Block B9). In this case, the sharpness map generation controller 113 generates a sharpness map of the image X1-X2, based on, for example, the sharpness map of the image X1 and the sharpness map of the image X2. The sharpness map of the image X1-X2 is a sharpness map using, as the sharpness of each block, greater sharpness, of the sharpness of the block in the sharpness map of the image X1 and the sharpness of the block in the sharpness map of the image X2. More specifically, if the sharpness of block A in the sharpness map of the image X2 is greater than the sharpness of block A in the sharpness map of the image X1, the sharpness of block A in the sharpness map of the image X2 is used as the sharpness of block A in the sharpness map of the image X1-X2. Block A has been explained here, but the same processing is also executed in the other blocks B-F.

In Block B9, the same processing as Block B3 is executed for the sharpness map of the image X1-X2 thus generated. If unnecessary blocks are excluded in Block B8 described above, the processing in Block B9 is executed based on sharpness of the blocks other than the unnecessary blocks in the sharpness map of the image X1-X2.

If it is determined that the image of sufficient sharpness is not obtained (NO in Block B9), the focus determination controller 115 executes the focus position determining processing, based on the focus set value F1 and the focus set value F2 held in he electronic device 10, and the sharpness map of the image X1 and the sharpness map of the image X2 stored in the sharpness map storage 114 (Block B10). According to the focus position determining processing, the focus set value indicating the focus position at the next photographing is determined. Details of the focus position determining processing will be described later.

Next, the camera controller 116 controls the camera 13 to take the image which is being displayed as the finder view, in a state in which the focus is adjusted to the focus position indicated by the focus set value.

The image acquisition controller 111 thereby acquires the third image (hereinafter called image X3 for convenience) (Block B11). The image X3 acquired by the image acquisition controller 111 is the same as the above-described image X1 and image X2 except that the focus positions in the images are different. The image acquisition controller 111 stores the acquired image X3 in the image storage 112.

The focus set value indicating the focus position at taking the image X3 (i.e., the focus position determined in Block B10) (hereinafter called focus set value F3) is held in the electronic device 10.

Next, the sharpness map generation controller 113 generates the sharpness map (hereinafter called sharpness map of image X3), based on the image X3 stored in the image storage 112 (Block B12). The sharpness map of the image X3 as generated here is a sharpness map having sharpness of each of blocks (for example, blocks A-F) obtained by dividing the image X3, similarly to the sharpness map of the image X1 and the sharpness map of the image X2. In other words, the blocks in the sharpness map of the image X1, the sharpness map of the image X2 and the sharpness map of the image X3 correspond to each other. The generation of the sharpness map has been explained in Block B2 described above, and its detailed descriptions are omitted. In addition, the sharpness map of the image X3 is stored in the sharpness map storage 114.

The sharpness map generation controller 113 determines whether an image of sufficient sharpness has been obtained during the photographing at three times or not, by referring to the sharpness map of the image X3 and the sharpness map of the image X1-X2 in Block B9 (Block B13). The processing in Block B13 has been explained in Block B9 described above except that it is executed by referring to the sharpness map of the image X3 and the sharpness map of the image X1-X2, and its detailed descriptions are omitted.

If it is determined that the image of sufficient sharpness is obtained (YES in Block B13), the image generation controller 117 generates a high sharpness image by using the image X1, the image X2 and the image X3 stored in the image storage 112 (Block B14). In this case, the image generation controller 117 generates an image of high sharpness (synthesized image) in the region corresponding to each block other than the blocks excluded as the unnecessary blocks, by synthesizing the image X1, the image X2 and the image X3.

In Block B14, other processing, etc. may be executed to generate an image of higher sharpness. More specifically, for example, if displacement of the image X1, the image X2 and the image X3, etc. occurs due to user's camera shake, processing for correcting the displacement, etc. may be executed or other processing for image quality enhancement (for example, blur restoring processing, etc.) may be executed.

The high sharpness image (synthesized image) thus generated is displayed on the touch screen display 12 by the display processor 118. The user can thereby confirm the high sharpness image obtained by the focal sweep. In addition, the high sharpness image is stored in the image storage 112. The user can thereby confirm the high sharpness image by reading the high sharpness image stored in the image storing module 112 even after the processing shown in FIG. 7 is executed.

On the other hand, if it is determined that the image of sufficient sharpness is obtained in Block B3 (YES in Block B3), the processing of Block B14 is executed by using the image X1 stored in the image storing module 112. In the processing of Block B14 in this case, a plurality of images do not need to be synthesized, but a high sharpness image is generated by, for example, executing processing for generating an image of higher sharpness for the image X1.

In addition, if it is determined that the image of sufficient sharpness is obtained in Block B9 (YES in Block B9), the processing of Block B14 is executed by using the image X1 and the image X2 stored in the image storage 112.

If it is determined that the image of sufficient sharpness has not been obtained in Block B13 (NO in Block B13), the processing returns to Block B10 and the processing of Blocks B10-B12 is repeated. In other words, a fourth or more images are sequentially taken until an image of sufficient sharpness is obtained, in the present embodiment.

The processing is repeated until an image of sufficient sharpness is obtained, as described above. However, by presetting an upper limit of the number of times of photographing required to generate the image of high sharpness in Block B14 (i.e., the number of images used for generation of the image of high sharpness), the image of high sharpness can be generated by using images obtained by photographing at the number of times if the number of times of photographing reaches the upper limit. According to this structure, the time required to generate the image of high sharpness can be reduced since the number of times of repeating the processing in Blocks B10-B12 can be limited.

According to the processing shown in FIG. 7, for example, if a plurality of subjects (i.e., a first subject and a second subject) are present in the photography area and a distance from each of the subjects to the camera 13 is equal to or more than a predetermined value, the image of high sharpness is generated by using a plurality of images obtained by photographing at a plurality of times since an image of sufficient sharpness can hardly be obtained by photographing at one time. In other words, the number of times of photographing using the camera 13 to generate the image of high sharpness in the present embodiment in a case where a difference between a distance from one subject to the camera 13 and a distance from the other subject to the camera 13 is equal to or more than a predetermined value, is different from that in a case where the difference is smaller than the predetermined value.

Figure 9:
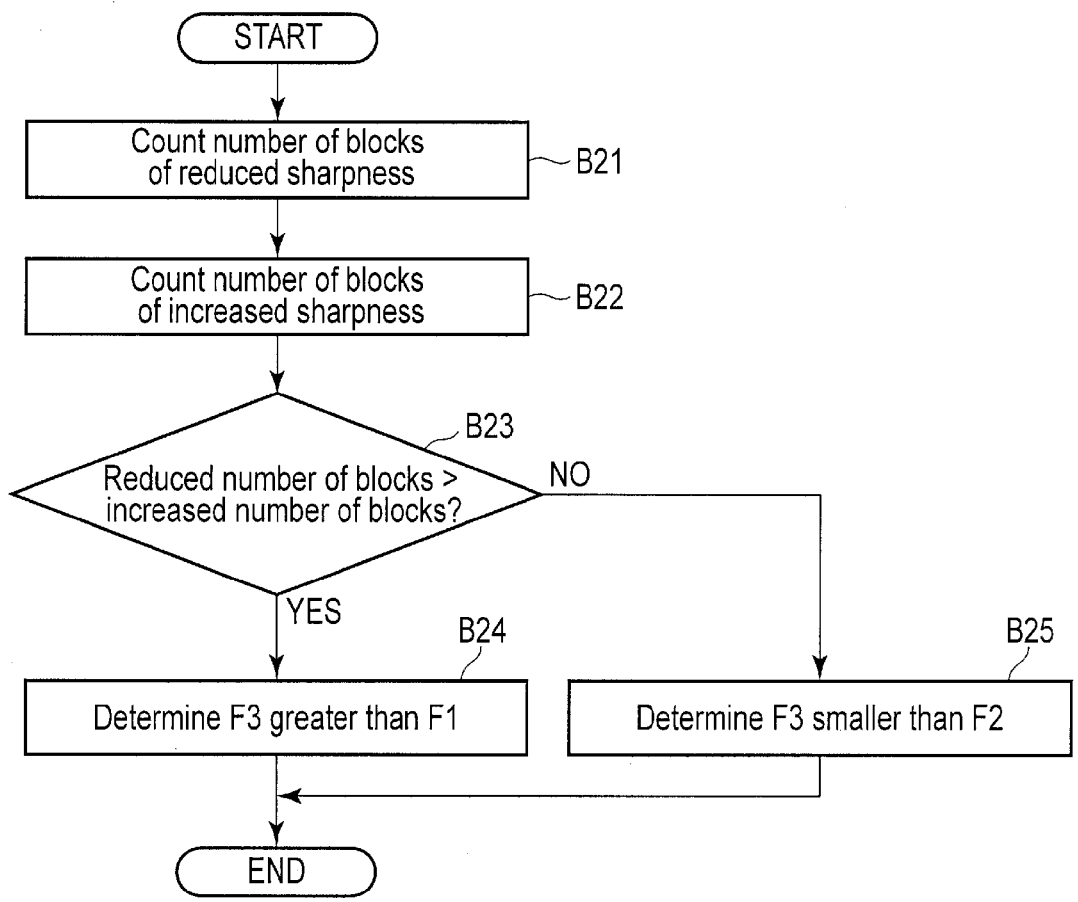
FIG. 9 is a flowchart showing an example of a procedure of focus position determining processing.

Next, a procedure for the focus position determination processing (i.e., the processing in Block B10 shown in FIG. 7) will be described with reference to a flowchart of FIG. 9. It is assumed here that the sharpness map of the image X1 and the sharpness map of the image X2 are stored in the sharpness map storage 114 and that the focus set value F1 and the focus set value F2 are held in the electronic device 10.

The focus set value F1 is a value indicating the focus position at taking the image X1 (i.e., the distance to the subject included in the region where the focus is adjusted). Similarly, the focus set value F2 is a value indicating the focus position at taking the image X2. The focus set value F1 is set to be greater than the focus set value F2 (F1>F2). In other words, the distance to the subject included in the region where the focus is adjusted at taking the image X1 is assumed to be longer than the distance to the subject included in the region where the focus is adjusted at taking the image X2.

First, the focus determination controller 115 counts the number of blocks having lowered sharpness by comparing sharpness of corresponding blocks in the sharpness map of the image X1 and the sharpness map of the image X2 stored in the sharpness map storage 114 (Block B21). In this case, the focus determination controller 115 counts the number of blocks, in the sharpness map of the image X2 having the sharpness smaller than the sharpness in the sharpness map of the image X1. The number of blocks counted in Block B21 is hereinafter called the reduced number of blocks.

In addition, the focus determination controller 115 counts the number of blocks having increased sharpness by comparing sharpness of corresponding blocks in the sharpness map of the image X1 and the sharpness map of the image X2 stored in the sharpness map storing module 114 (Block B22). In this case, the focus determination controller 115 counts the number of blocks, in the sharpness map of the image X2 having the sharpness greater than the sharpness in the sharpness map of the image X1. The number of blocks counted in Block B22 is hereinafter called the increased number of blocks.

The blocks to be counted in Blocks B21 and B22 are blocks in which the sharpness in the sharpness map of the image X1-X2 is not equal to or greater than a threshold value and which are not excluded in Block B8 shown in FIG. 7.

Next, the focus determination controller 115 determines whether the reduced number of blocks is more than the increased number of blocks or not (Block B23).

It is assumed here that the reduced number of blocks is determined to be greater than the increased number of blocks (YES in Block B23). In this case, if the focus set value F1 is set to be greater than the focus set value F2 as described above, it is predicted that the blocks having increased sharpness may be increased by setting the focus set value to be greater than the focus set value F1. For this reason, the focus determination controller 115 determines a focus set value F3 greater than the focus set value F1 (i.e., the focus set value F3 greater than the focus set value F1 which is greater than the focus set value F2) as shown in FIG. 10, as a focus position for the next photographing (Block B24).

In this case, the focus set value F3 can be determined by, for example, applying the auto focus function to one or more regions, of the blocks counted as the reduced number of blocks. Since the focus set value F3 may be varied in a direction opposite to the variation from the focus set value F1 to the focus set value F2, the focus set value F3 may be determined as, for example, "focus set value F1+(focus set value F1−focus set value F2)" or determined by, for example, adding a predetermined value to the focus set value F1. In addition, the focus set value F3 may be weighted by, for example, using sharpness of the blocks counted as the reduced number of blocks.

On the other hand, it is assumed that the reduced number of blocks is not determined to be greater than the increased number of blocks (i.e., the increased number of blocks is greater than the reduced number of blocks) (NO in Block B23). In this case, by setting the focus set value to be smaller than the focus set value F2, sharpness can be further increased in the blocks in which sharpness is increased by varying the focus set value F1 to the focus set value F2 but sharpness is insufficient. For this reason, the focus determination controller 115 determines the focus set value F3 smaller than the focus set value F1 (i.e., the focus set value F3 smaller than the focus set value F2 which is smaller than the focus set value F1) as shown in FIG. 11, as a focus position for the next photographing (Block B24).

In this case, the focus set value F3 can be determined by, for example, applying the auto focus function to one or more regions, of the blocks counted as the increased number of blocks. Since the focus set value F3 may be smaller than the focus set value F2, the focus set value F3 may be determined by, for example, subtracting a predetermined value from the focus set value F2. In addition, the focus set value F3 may be weighted by, for example, using sharpness of the blocks counted as the increased number of blocks.

According to the focus position determining processing, a focus set value (focus position) which can be expected to acquire an image of high sharpness in regions corresponding to blocks of insufficient sharpness in the image X1 and the image X2 can be determined, based on the sharpness map of the image X1, the sharpness map of the image X2, the focus set value F1, and the focus set value F2.

The focus set value F1 has been explained as the value greater than the focus set value F2. However, the focus set value F3 can also be determined even in a case where the focus set value F1 is smaller than the focus set value F2. More specifically, if it is determined in Block B23 that the reduced number of blocks is greater than the increased number of blocks, the focus set value F3 is determined to be smaller than the focus set value F1 in Block B24. On the other hand, if it is determined in Block B23 that the increased number of blocks is greater than the reduced number of blocks, the focus set value F3 is determined to be greater than the focus set value F2 in Block B25.

In the present embodiment, the number of times of photographing required to generate the image of high sharpness can be controlled by executing the above-described processing.

According to the present embodiment, when the image X1 is taken in a state in which the focus of the camera 13 is adjusted, the number of times of taking the images required to generate the image of high sharpness is varied depending on whether a characteristic subject (for example, a character or the like) is included in a region other than the region where the focus is adjusted in the image X1. A simple example of this case will be hereinafter explained.

In the following explanations, the sharpness of each block in the sharpness map is a value which falls within a range of 1 to 10. In addition, the sharpness is set to be 10 when an image is clearest, and is set to be 1 when an image is not clearest.

First, a case where characteristic subjects are included in a region other than the region where the focus is adjusted in the image X1 will be explained.

Figure 12:
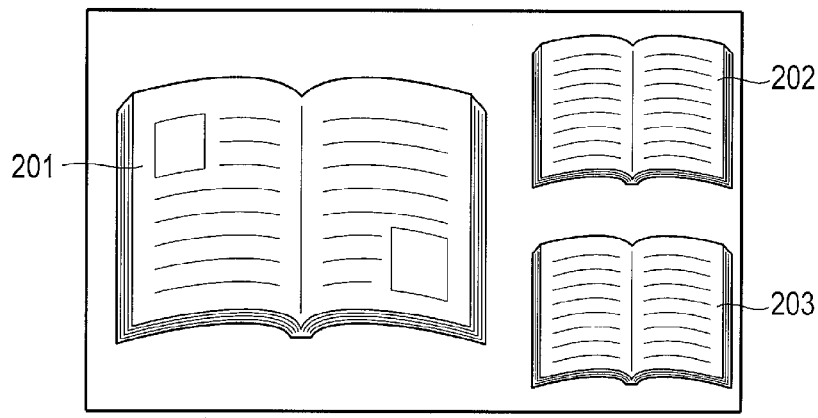
FIG. 12 is an illustration for explanation of the number of times of photographing to generate a high sharpness image.

It is assumed here that three double spread documents 201-203 as shown in FIG. 12 are photographed. In this case, the image X1 is taken in a state in which the focus is adjusted to the region including the document 201 by the auto focus function. In other words, (characters described in) the documents 202 and 203 are assumed to be included in the region other than the region where the focus is adjusted, as the characteristic subjects.

Figure 13:
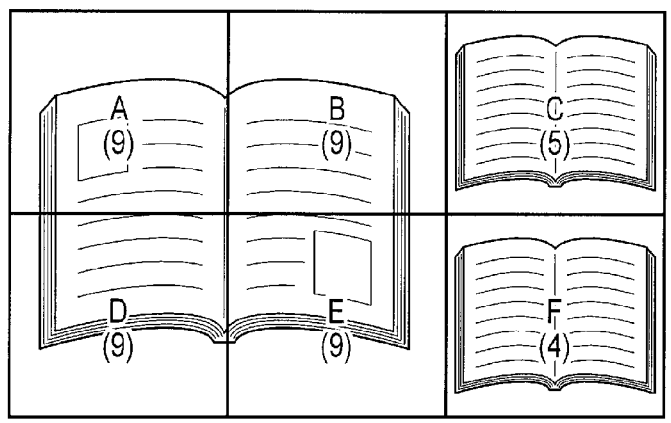
FIG. 13 is an illustration for explanation of the number of times of photographing to generate a high sharpness image.

In this case, a sharpness map of the image X1 as shown in FIG. 13 is generated. The sharpness of each of blocks A, B, D and E in the sharpness map of the image X1 shown in FIG. 13 is 9, the sharpness of block C is 5, and the sharpness of block F is 4.

If the sharpness of each of blocks A, B, D and E, of the blocks in the sharpness map of the image X1 shown in FIG. 13, is equal to or greater than a threshold value (for example, 8) but the sharpness of each of the blocks C and F is not equal to or greater than the threshold value, an image of sufficient sharpness is not determined to be obtained.

In this case, the image X2 is taken in a state in which the focus is adjusted to the region corresponding to block F having the lowest sharpness (i.e., the region including the document 203).

Figure 14:
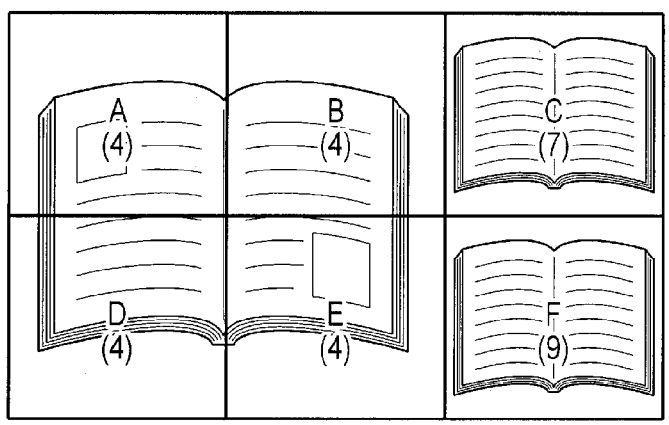
FIG. 14 is an illustration for explanation of the number of times of photographing to generate a high sharpness image.

When the image X2 is thus taken, a sharpness map of the image X2 as shown in FIG. 14 is generated. The sharpness of each of blocks A, B, D and E in the sharpness map of the image X2 shown in FIG. 14 is 4, the sharpness of block C is 7, and the sharpness of block F is 9.

The details are omitted here since they have been explained above. The sharpness of each of blocks A, B, D, E and F in the image X1-X2 generated based on the sharpness map of the image X1 shown in FIG. 13 and the sharpness map of the image X2 shown in FIG. 14 is 9, and the sharpness of block C is 7.

In this case, an image of sufficient sharpness is not determined to be obtained since the sharpness of each of blocks A, B, D, E and F, of the blocks in the sharpness map of the image X1-X2, is equal to or greater than the threshold value but the sharpness of the block C is not equal to or greater than the threshold value.

Next, the focus position which enables the sharpness of the region corresponding to the block C (i.e., the region including the document 202) to be increased is determined by the focus position determining processing. An image X3 in which the sharpness of the region corresponding to the block C is increased is thereby taken.

If such image X3 is taken, an image of sufficient sharpness is determined to be obtained, and a high sharpness image can be generated by using the image X1, the image X2 and the image X3.

Thus, when three double open documents 201-203 as shown in FIG. 12 are photographed, and when the first image is taken in the state in which the focus is adjusted to the regions including the document 201, of the documents 201-203, the number of times of photographing required to generate a high sharpness image is three.

Next, a case where characteristic subjects are not included in a region other than the region where the focus is adjusted in the image X1 will be explained.

Figure 15:
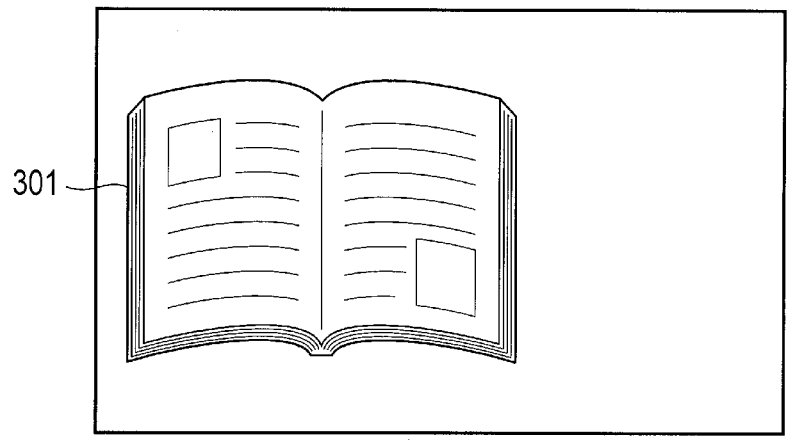
FIG. 15 is an illustration for explanation of the number of times of photographing to generate a high sharpness image.

It is assumed here that a double spread document 301 as shown in FIG. 15 is photographed. In this case, the image X1 is taken in a state in which the focus is adjusted to the region including the document 301 by the auto focus function. In other words, a characteristic subject is not included in the region other than the region where the focus is adjusted.

Figure 16:
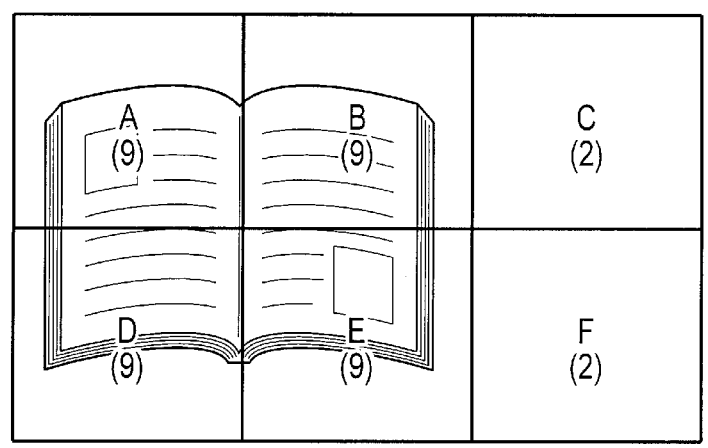
FIG. 16 is an illustration for explanation of the number of times of photographing to generate a high sharpness image.

In this case, a sharpness map of the image X1 as shown in FIG. 16 is generated. The sharpness of each of blocks A, B, D and E in the sharpness map of the image X1 shown in FIG. 16 is 9, and the sharpness of each of blocks C and F is 2. Since the sharpness of each of blocks A, B, D and E, of the blocks in the sharpness map of the image X1 shown in FIG. 13, is equal to or greater than the threshold value but the sharpness of each of the blocks C and F is not equal to or greater than the threshold value, an image of sufficient sharpness is not determined to be obtained.

In this case, the image X2 is taken in a state in which the focus is adjusted to, for example, the region corresponding to the block F having the lowest sharpness.

Figure 17:
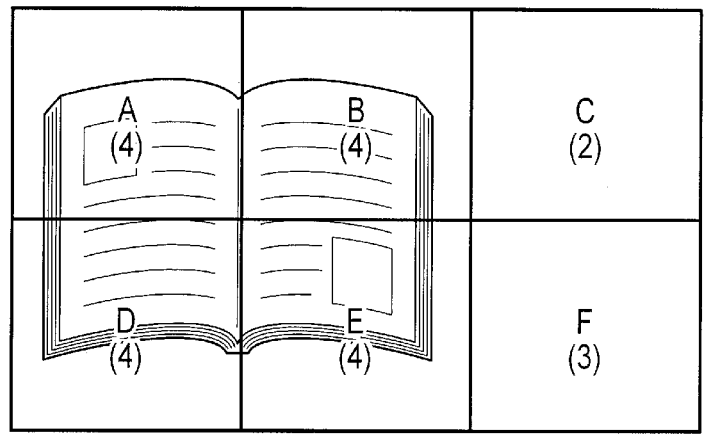
FIG. 17 is an illustration for explanation of the number of times of photographing to generate a high sharpness image.

When the image X2 is thus taken, a sharpness map of the image X2 as shown in FIG. 17 is generated. The sharpness of each of blocks A, B, D and E in the sharpness map of the image X2 shown in FIG. 17 is 4, the sharpness of block C is 2, and the sharpness of block F is 3. In the regions where a characteristic subject is not included (i.e., the regions corresponding to the blocks C and F), variation in sharpness is small (i.e., the sharpness is not improved) even when the focus is adjusted to the regions and photographing is executed.

The sharpness of each of blocks A, B, D, and E in the image X1-X2 generated based on the sharpness map of the image X1 shown in FIG. 16 and the sharpness map of the image X2 shown in FIG. 17 is 9, the sharpness of the block C is 2, and the sharpness of block F is 3.

The blocks C and F are excluded in subsequent processing since it can be predicted that no characteristic subject is present and the sharpness is evaluated to be relatively low in the regions corresponding to the blocks C and F having lower sharpness, in the sharpness map of the image X1-X2 (i.e., the sharpness map of the image X1 and the sharpness map of the image X2).

In this case, an image of sufficient sharpness is determined to be obtained since the sharpness of each of blocks A, B, D, and E, other than the blocks C and F, in the sharpness map of the image X1-X2, is equal to or greater than the threshold value. A high sharpness image can be generated by using the image X1 and the image X2.

Thus, when the double open document 301 as shown in FIG. 15 is photographed, and when the first image is taken in the state in which the focus is adjusted to the regions including the document 301, the number of times of photographing required to generate a high sharpness image is two.

The number of times of taking the images required to generate the image of high sharpness is varied depending on whether a characteristic subject is included in a region other than the region where the focus is adjusted in the image X1. The number of times of taking the images is also varied depending on whether a characteristic subject is included in the region where the focus is adjusted in the image X1. A simple example of this case will be hereinafter explained.

First, a case where characteristic subjects are included in the region where the focus is adjusted in the image X1 will be explained.

It is assumed here that the double spread document 301 as shown in FIG. 15 is photographed. In this case, the image X1 is taken in a state in which the focus is adjusted to the region including the document 301 by the auto focus function. In other words, (characters described in) the document 301 (are)is assumed to be included in the region where the focus is adjusted.

The concrete operations for generating a high sharpness image of this case have been explained with reference to FIG. 16 and FIG. 17, and their detailed descriptions are omitted. Thus, when the double open document 301 as shown in FIG. 15 is photographed, and when the first image is taken in the state in which the focus is adjusted to the regions including the document 301, the number of times of photographing required to generate a high sharpness image is two.

Next, a case where a characteristic subjects is not included in the region where the focus is adjusted in the image X1 will be explained.

It is assumed here that the double spread document 301 as shown in FIG. 15 is photographed. In this case, the image X1 is taken in a state in which the focus is adjusted to the region other than the regions including the document 301 by the auto focus function. In other words, a characteristic subject is not included in the region where the focus is adjusted.

In this case, the sharpness map of the image X1 as shown in FIG. 17 is generated. FIG. 17 shows the sharpness map of the image X1 taken in a state in which the focus is adjusted to the region corresponding to the block F (i.e., the region other than the regions including the document 301). The sharpness of each of blocks A, B, D and E in the sharpness map of the image X1 shown in FIG. 17 is 4, the sharpness of block C is 2, and the sharpness of block F is 3. Since the sharpness of each of blocks A-F, of the blocks in the sharpness map of the image X1 shown in FIG. 17, is not equal to or greater than the threshold value, an image of sufficient sharpness is not determined to be obtained.

In this case, the image X2 is taken in a state in which the focus is adjusted to the region corresponding to the block C having the lowest sharpness.

Figure 18:
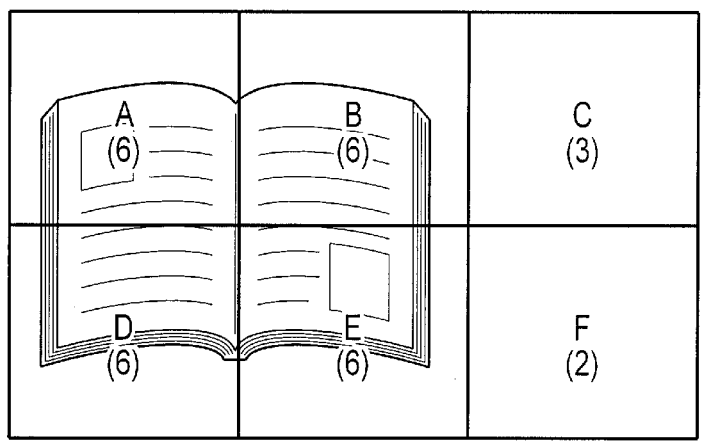
FIG. 18 is an illustration for explanation of the number of times of photographing to generate a high sharpness image.

When the image X2 is thus taken, a sharpness map of the image X2 as shown in FIG. 18 is generated. The sharpness of each of blocks A, B, D and E in the sharpness map of the image X2 shown in FIG. 18 is 6, the sharpness of block C is 3, and the sharpness of block F is 2. In the regions where a characteristic subject is thus included (i.e., the regions corresponding to the blocks A, B, D and E), the sharpness is not sufficient since the photographing is not executed in a state in which the focus is adjusted to the regions, but the sharpness is varied due to change of the regions where the focus is adjusted. On the other hand, variation in sharpness is small in the regions where a characteristic subject is not included (i.e., the regions corresponding to the blocks C and F).

The sharpness of each of blocks A, B, D, and E in the image X1-X2 generated based on the sharpness map of the image X1 shown in FIG. 17 and the sharpness map of the image X2 shown in FIG. 18 is 6, the sharpness of the block C is 3, and the sharpness of block F is 3.

The blocks C and F are excluded in subsequent processing since it can be predicted that no characteristic subject is present and the sharpness is evaluated to be relatively low in the regions corresponding to the blocks C and F having lower sharpness, in the sharpness map of the image X1-X2 (i.e., the sharpness map of the image X1 and the sharpness map of the image X2).

On the other hand, the sharpness of each of blocks A, B, D and E is not equal to or greater than a threshold value (for example, 8) but the sharpness is varied at a certain extent. The blocks A, B, D and E are not therefore excluded in the subsequent processing.

In this case, an image of sufficient sharpness is not determined to be obtained since the sharpness of each of blocks A, B, D, and E, other than the blocks C and F, in the sharpness map of the image X1-X2, is not equal to or greater than the threshold value.

The focus position which enables the sharpness of the regions corresponding to the blocks A, B, D and E (i.e., the regions including the document 301) to be increased is determined by the focus position determining processing. An image X3 in which the sharpnesses of the regions corresponding to the blocks A, B, D and E are increased is thereby taken.

If such image X3 is taken, an image of sufficient sharpness is determined to be obtained, and a high sharpness image can be generated by using the image X1, the image X2 and the image X3.

Thus, when the double spread document 301 as shown in FIG. 15 is photographed, and when the first image is taken in the state in which the focus is adjusted to regions other than the regions including the document 301, the number of times of photographing required to generate a high sharpness image is three.

In the present embodiment, as described above, photographing with different focuses is automatically executed at one or more times by using the camera 13, for example, in the photography area (the photography range) including at least the region where each of the plurality of subjects (i.e., the first subject and the second subject) is located, one or more first images generated by photographing the photography area with different focuses by the camera 13 are acquired, and the second image is displayed on the display by using the first images. In this case, the number of times of photographing using the camera 13 (i.e., the number of exposures at the photographing range of a first photographing and a second photographing) to generate the image of high sharpness in a case where a difference among the distances from the camera 13 to the respective subjects is greater than or equal to a predetermined value (first value), is different from that in a case where the difference is smaller than the predetermined value.

In addition, in the present embodiment, the number of times of photographing using the camera 13 is varied depending on whether, as compared with a subject (second subject) located in a region (second region) other than a region (first region) including a specific subject (first subject), characters are included in the regions other than the specific region included in the image taken in a state in which the focus is adjusted to the specific subject.

Furthermore, in the present embodiment, In addition, in the present embodiment, the number of times of photographing using the camera 13 is varied depending on whether, as compared with the subject (second subject) located in the region (second region) other than the region (first region) including the specific subject (first subject), characters are included in the specific region included in the image taken in a state in which the focus is adjusted to the specific subject.

In other words, in the present embodiment, the time required to generate the high sharpness image can be reduced and the image of high sharpness can be obtained efficiently since the number of times of photographing required to generate the high sharpness image can be controlled by using the sharpness map.

In addition, in the present embodiment, for example, even when the image of sufficient sharpness cannot be obtained by photographing at one time, the high sharpness image can be generated and displayed by synthesizing a plurality of images generated by automatically executing the photographing at a plurality of times with different focuses using the camera 13.

In the present embodiment, as described above, the electronic device 10 may be configured to have a function of notifying the user of the number of times of taking images since the number of times of photographing required to generate the high sharpness image is varied.

More specifically, when photographing is executed by the camera 13 built in the electronic device 10 (for example, a tablet computer or a smartphone), sound (for example, shutter sound) is generally emitted. By using this, the sound emitted at the photographing is changed in accordance with, for example, the number of times of photographing the photography area (taking images) by the camera 13. According to this structure, the user can be notified of the number of times of taking images using the focal sweep.

The present embodiment can be applied to photographing, besides the double spread documents, a subject, such as a whiteboard or newspaper on which characters are described, from which an image having high sharpness as a whole needs to be obtained such that the contents can be recognized from the subject.

Since the processing of the present embodiment can be implemented by the computer program, advantages similar to the advantages of the present embodiment can easily be obtained by installing the computer program in a computer via a computer-readable storage medium in which the computer program is stored and by merely executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. An electronic device, comprising:
a camera; and
circuitry configured to:
automatically execute exposures at a photographing range, with different focuses by the camera, the photographing range comprising at least a first region where a first subject is located and a second region where a second subject is located; and
acquire first images generated by the exposures, and display a second image on a display based on the first images,
wherein the circuitry is further configured to:
divide the first image of the photographing range captured for the first time by the camera into blocks and analyze sharpness of each of the blocks;
acquire, if the sharpness of at least one of the blocks is less than a predetermined threshold value, the other first image of the photographing range with the focus on a region corresponding to a block which has the lowest sharpness; and
generate the second image by synthesizing a block image of the first image which is acquired for the first time and has sharpness greater than or equal to the predetermined threshold value, and a block image of the other first image which is acquired from the second time and onward and has sharpness greater than or equal to the predetermined threshold value.

2. The device of claim 1, wherein
the number of exposures at the photographing range is varied depending on whether a character exists in the second region where the second subject is located of the first images exposed when a focus is more adjusted to the first subject than to the second subject.

3. The device of claim 1, wherein
the number of exposures at the photographing range is varied depending on whether a character exists in the first region where the first subject is located of the first images exposed when a focus is more adjusted to the first subject than to the second subject.

4. The device of claim 1, wherein
the circuitry is further configured to automatically execute a plurality of exposures with different focuses by the camera, and
the second image is generated by synthesizing a plurality of the first images which correspond to the plurality of blocks.

5. The device of claim 1, wherein
the circuitry is further configured to:
emit a sound at each exposure,
change the sound emitted at each exposure in accordance with the number of exposures at the photographing range.

6. A method, comprising:
automatically executing exposures at a photographing range, with different focuses by a camera, the photographing range comprising at least a first region where a first subject is located and a second region where a second subject is located;
dividing a first image of the photographing range captured for the first time by the camera into blocks and analyzing sharpness of each of the blocks;
acquiring, if the sharpness of at least one of the blocks is less than a predetermined threshold value, another first image of the photographing range with the focus on a region corresponding to a block which has the lowest sharpness;
generating a second image by synthesizing a block image of the first image which is acquired for the first time and has sharpness greater than or equal to the predetermined threshold value, and a block image of the other first image which is acquired from the second time and onward and has sharpness greater than or equal to the predetermined threshold value; and
displaying the generated second image on a display.

7. The method of claim 6, wherein
the number of exposures at the photographing range is varied depending on whether a character exists in the second region where the second subject is located of the first images exposed when a focus is more adjusted to the first subject than to the second subject.

8. The method of claim 6, wherein
the number of exposures at the photographing range is varied depending on whether a character exists in the first region where the first subject is located of the first images exposed when a focus is more adjusted to the first subject than to the second subject.

9. The method of claim 6, wherein
the second image is generated by synthesizing a plurality of the first images which correspond to the plurality of blocks and are photographed by automatically executing a plurality of exposures with different focuses by the camera.

10. The method of claim 6, further comprising:
emitting a sound at each exposure; and
changing the sound emitted at each exposure in accordance with the number of exposures at the photographing range.

11. A non-transitory computer-readable storage medium having stored thereon a computer program which is executable by a computer, the computer program comprising instructions capable of causing the computer to execute functions of:
automatically executing exposures at a photographing range, with different focuses by a camera, the photographing range comprising at least a first region where a first subject is located and a second region where a second subject is located;
dividing a first image of the photographing range captured for the first time by the camera into blocks and analyzing sharpness of each of the blocks;
acquiring, if the sharpness of at least one of the blocks is less than a predetermined threshold value, another first image of the photographing range with the focus on a region corresponding to a block which has the lowest sharpness;
generating a second image by synthesizing a block image of the first image which is acquiring for the first time and has sharpness greater than or equal to the predetermined threshold value, and a block image of the other first image which is acquiring from the second time and onward and has sharpness greater than or equal to the predetermined threshold value; and displaying the generated second image on a display.

12. The computer-readable storage medium of claim 11, wherein
the number of exposures at the photographing range is varied depending on whether a character exists in the second region wherein the second subject is located of the first image exposed when a focus is more adjusted to the first subject than to the second subject.

13. The computer-readable storage medium of claim 11, wherein
the number of exposures at the photographing range by the camera is varied depending on whether a character exists in the first region wherein the first subject is located of the first image exposed when a focus is more adjusted to the first subject than to the second subject.

14. The computer-readable storage medium of claim 11, wherein
the second image is generated by synthesizing a plurality of the first images which correspond to the plurality of blocks.

15. The computer-readable storage medium of claim 11, wherein the computer program further comprises instructions capable of causing the computer to further execute:
emitting a sound at each exposure; and
changing the sound emitted at each exposure in accordance with the number of exposures at the photographing range by the camera.

\* \* \* \* \*